May 31, 1960
H. W. BARNETT
2,938,590
CONVEYING DEVICE
Filed Dec. 9, 1957
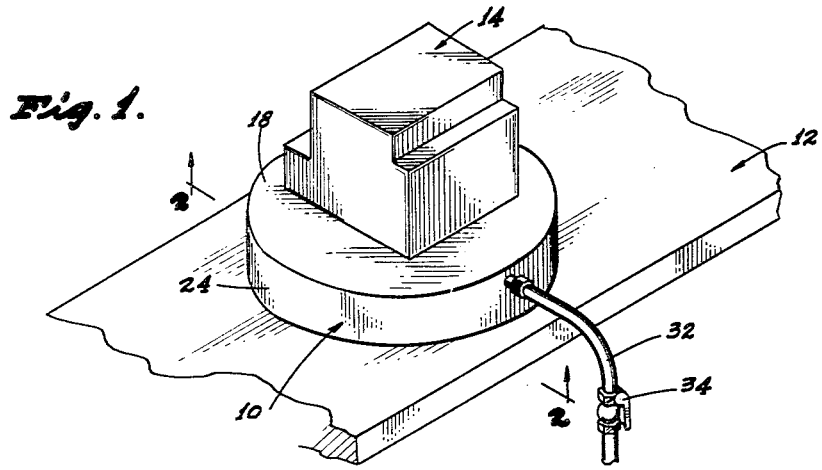
Fig. 1.
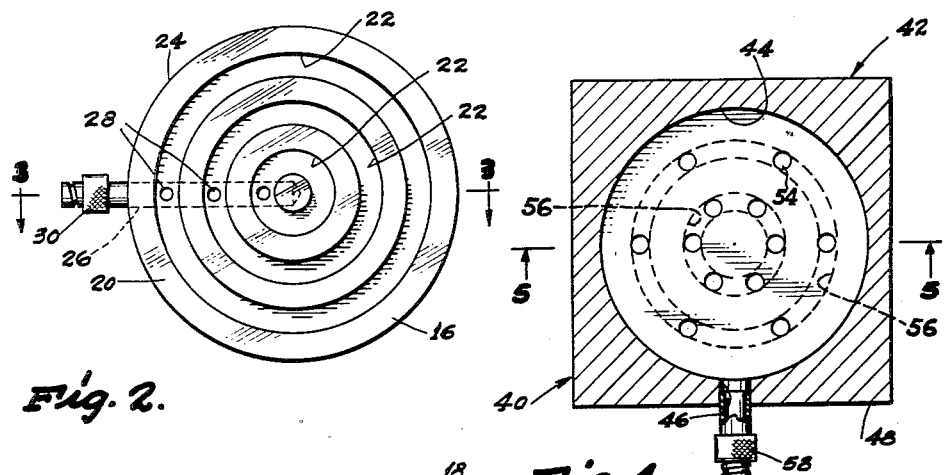
Fig. 2.
Fig. 4.
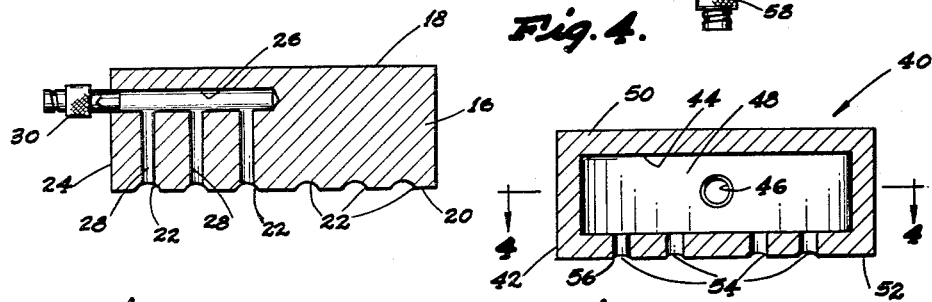
Fig. 3.
Fig. 5.
INVENTOR.
HENRY W. BARNETT
BY
Thomas P. Mahoney
ATTORNEY

United States Patent Office 2,938,590
Patented May 31, 1960

2,938,590

CONVEYING DEVICE

Henry W. Barnett, 8212 E. 5th St., Downey, Calif.

Filed Dec. 9, 1957, Serial No. 701,623

6 Claims. (Cl. 180—1)

This invention relates to a pneumatic conveying device adapted to be utilized in machine shops, factories, or similar environments in moving a workpiece from one position to another on a workbench or on the table or bed of a machine tool, or the like.

It is well known to those skilled in the art that quite heavy workpieces must be handled repeatedly and moved upon the tables or beds of such machine tools as drill presses, mills, and other machine tools of similar nature during the processing of said workpieces and the performance of successive operations thereupon. For instance, in multiple spindle drill presses it is frequently necessary to shift the workpiece from one position to another on the bed of the press in order that successive operations may be performed thereupon. At the present time, movement of the workpiece from one position to another on the drill press table entails considerable physical effort on the part of the workman operating the drill press, especially when the workpiece is a relatively heavy and cumbersome part.

It is, therefore, an object of my invention to provide a pneumatic conveyor which consists of a body having an upper supporting surface for receiving and supporting a workpiece and having a lower surface which is adapted to be positioned upon the adjacent surface of the work table or bed with which the conveying device is associated. The body of the conveying device is connected to a source of fluid pressure such as compressed air and when it is desired to move the workpiece from one position to another on the bed or table, it is merely necessary to open the compressed air valve and compressed air will be fed into the body of the conveying device and through outlet ports therein to raise said body a sufficient distance above the surface of the bed or table to permit it to be readily removed to another position thereupon with a minimum expenditure of physical energy by the workman utilizing the conveying device.

Thus, relatively heavy and bulky parts can be moved from one position to another on a work table or bed without the expenditure of time and effort entailed in moving such workpieces when the conveying device of my invention is not utilized.

Another factor involved in moving heavy workpieces around on tables and beds of machine tools is the fact that frequently, during the movement thereof, said workpieces are damaged or broken.

Another object of my invention is the provision of a conveying device of the aforementioned character wherein the aforesaid body of the device has its upper and lower surfaces disposed in substantial parallelism and wherein the lower surface thereof is provided with a plurality of fluid ports adapted to permit the flow of compressed air through the lower surface of the body of the conveying device whereby said body is supported upon a cushion of compressed air and the conveying device and the workpiece supported thereupon can be readily moved from one location to another on the work table or bed.

Other objects and advantages of my invention will be apparent from the following specification and the accompanying drawing which is for the purpose of illustration only and in which:

Fig. 1 is a perspective view showing a pneumatic conveying device of my invention associated with a workpiece and a bed of a machine tool;

Fig. 2 is a bottom plan view taken on the broken line 2—2 of Fig. 1;

Fig. 3 is a transverse, sectional view taken on the broken line 3—3 of Fig. 2;

Fig. 4 is a transverse, sectional view taken on the broken line 4—4 of Fig. 5; and Fig. 5 is a vertical, sectional view taken on the broken line 5—5 of Fig. 4.

Referring to the drawing and particularly to Figs. 1–3 thereof, I show a pneumatic conveying device 10 constructed in accordance with the teachings of my invention, said conveying device, as best shown in Fig. 1 of the drawing, being adapted to be utilized in conjunction with the bed 12 of a machine tool, such as a multiple drill press or the like. The conveying device 10 of my invention will support a workpiece 14 upon the bed 12 and, in a manner to be described in greater detail below, facilitate the expeditious movement of said workpiece upon the bed 12.

The conveying device 10 is substantially cylindrical in configuration and is, in the present embodiment, formed by casting from iron or similar metals. After the body 16 of the conveying device 10 has been cast, it is subjected to several machining operations. In the first place, both the upper supporting surface 18 and the lower engaging surface 20 are ground with considerable accuracy in order that the two surfaces may be substantially parallel to each other and in order that the interposition of the body 16 between the bed 12 and the workpiece 14 will not cause deviations in the operation being performed upon the workpiece 14. After the upper and lower surfaces 18 and 20 have been ground by the use of a surface grinder or the like, a plurality of circular concentric grooves 22 is formed in the lower surface 20 with the outermost of said grooves spaced inwardly from the peripheral edge 24 of the body 16. These grooves can be formed in the lower engaging surface 20 of the body 16 by the use of a milling machine or similar machine tool.

After the completion of the grooves 22 in the lower surface 20, a radial bore 26 is formed in the body 16, said bore, as best shown in Figs. 2 and 3 of the drawing, extending from the edge 24 of the body 16 to substantially the center of said body. After the formation of the bore 26 in the above described manner, a plurality of perpendicular ports 28 is formed in the body 16, said ports communicating at their upper extremities with the bore 26 and at their lower extremities with the grooves 22. A fluid inlet fitting 30 of conventional character is mounted in the outer extremity of the bore 26 and is adapted to have an air hose 32 affixed thereto so that pressure fluid, such as compressed air, can be transmitted from an appropriate source to the bore 26.

During the operation of the conveying device 10 of my invention, it is placed upon the surface of the bed 12 with the lower engaging surface 20 thereof juxtaposed to and supported upon the adjacent surface of said bed. A workpiece 14 is then deposited thereupon, the parallel upper and lower surfaces 18 and 20 serving to prevent disorientation of said workpiece with respect to the bed 12 and a machine tool, not shown, associated with said bed.

It is readily understood that the workpiece 14 may be a relatively heavy part such as a casting and that means of attaching the workpiece 14 in operative association with the conveying device 10 can be provided to prevent the workpiece 14 from shifting on the upper surface 18 of said conveying device. For instance, conventional dovetail grooves and clamps can be provided on the upper surface 18 of the conveying device 10 to securely fasten the workpiece 14 in operative relationship therewith. When movement of the workpiece 14 to another station on the bed 12 is desired, it is merely necessary to open a valve 34 in the hose line 32 so that compressed air, or equivalent compressed fluid, may be fed into the bore 26, through the ports 28 and around the grooves 22. When this occurs, the lower surface 20 of the body 16 is raised on a cushion of air which permits the conveying device 10 to be freely moved to the next desired station. Simultaneously, a blast of air is forced beyond the peripheral edge 24 of the body 16 which causes chips and other debris which might impede the movement of the conveying device 10 to be blown away from the path of the conveying device 10.

During the movement of the conveying device 10 in the above described manner, the workman need merely lightly guide the conveying device to the desired station and there is no necessity for the exertion of undue force to move the workpiece 14 to said station.

An alternative embodiment 40 of the conveying device of my invention is shown in Figs. 4 and 5 of the drawing as having a substantially square body 42 which incorporates a plenum chamber 44. The body 42 may be formed from a casting and is provided with a port 46 in a side wall 48 thereof, said port communicating with the interior of the chamber 44. The top and bottom surfaces 50 and 52 of the body 42 are co-planar and the bottom wall of the chamber 44 is provided with a plurality of ports 54 which communicate at their upper extremities with the chamber 44 and at their lower extremities with grooves 56 in the lower surface 52. An air fitting 58 is mounted in the port 46 and serves to supply compressed air to the chamber 44. The grooves 56 may be arranged in either a circular pattern, as illustrated in the embodiment of the conveying device 10 in Fig. 2 of the drawing, or, if desired, the grooves may be constituted by three diametrical lines each incorporating four ports 54.

The operation of the conveying device 40 is substantially identical with that of the previously discussed conveying device 10 and, therefore, will not be described in detail.

I thus provide by my invention a pneumatic conveying device which is adapted to be utilized in conjunction with the workbench or table of various types of machine tools and the like to convey a workpiece from one stage to another to permit the performance of successive operations upon said workpiece. In this manner, undue exertion by the workman handling the workpiece or possible damage or injury to the workpiece are eliminated.

I claim as my invention:

1. In a device adapted to be disposed on a supporting surface for movement relative thereto to convey an article supported on said device, the combination of: a body having a lower surface engageable with said supporting surface and an upper surface for receiving said article, said body incorporating a fluid transmitting bore extending from an edge thereof and a plurality of perpendicular fluid transmitting ports in communication with said bore and said lower surface; and a fluid inlet fitting mounted in said edge in communication with said bore.

2. In a device adapted to be disposed on a supporting surface for movement relative thereto to convey an article supported on said device, the combination of: a body having a lower surface engageable with said supporting surface and an upper surface for receiving said article, said body incorporating a fluid transmitting bore extending from an edge thereof and a plurality of perpendicular fluid transmitting ports in communication with said bore and said lower surface, said lower surface having a plurality of grooves therein and said ports communicating with said grooves; and a fluid inlet fitting mounted in said edge in communication with said bore.

3. In a device adapted to be disposed on a supporting surface for movement relative thereto to convey an article supported on said device, the combination of: a cylindrical, metallic body having a lower surface engageable with said supporting surface and an upper surface parallel with said lower surface for receiving said article, said body incorporating a fluid transmitting bore extending from an edge thereof and a plurality of perpendicular fluid transmitting ports in communication with said bore and said lower surface; and a fluid inlet fitting mounted in said edge in communication with said bore.

4. In a device adapted to be disposed on a supporting surface for movement relative thereto to convey an article supported on said device, the combination of: a cylindrical, metallic body having a lower surface engageable with said supporting surface and an upper surface parallel with said lower surface for receiving said article, said body incorporating a fluid transmitting bore extending from an edge thereof and a plurality of perpendicular fluid transmitting ports in communication with said bore and said lower surface, said lower surface having a plurality of grooves therein and said ports communicating with said grooves; and a fluid inlet fitting mounted in said edge in communication with said bore.

5. In a device adapted to be disposed on a supporting surface for movement relative thereto to convey an article supported on said device, the combination of: a body having a lower surface engageable with said supporting surface and an upper surface for receiving said article, said body incorporating a fluid transmitting bore extending from an edge thereof and a plurality of perpendicular fluid transmitting ports in communication with said bore and said lower surface, said lower surface having a plurality of circular, concentric grooves therein and said ports communicating with said grooves; and a fluid inlet fitting mounted in said edge in communication with said bore.

6. In a device adapted to be disposed on a supporting surface for movement relative thereto to convey an article supported on said device, the combination of: a cylindrical, metallic body having a lower surface engageable with said supporting surface and an upper surface parallel with said lower surface for receiving said article, said body incorporating a fluid transmitting bore extending from an edge thereof and a plurality of perpendicular fluid transmitting ports in communication with said bore and said lower surface, said lower surface having a plurality of circular, concentric grooves therein and said ports communicating with said grooves; and a fluid inlet fitting mounted in said edge in communication with said bore.

References Cited in the file of this patent

UNITED STATES PATENTS

| | | |
|---|---|---|
| 978,916 | Matchette | Dec. 20, 1910 |
| 1,698,482 | Nicin | Jan. 8, 1929 |
| 2,814,064 | Montgomery | Nov. 26, 1957 |
| 2,832,986 | Seck | May 6, 1958 |